United States Patent
Ponnathpur et al.

(10) Patent No.: US 12,060,821 B2
(45) Date of Patent: Aug. 13, 2024

(54) INLINE FILTER ASSEMBLY WITH PURGE VALVING

(71) Applicant: CUMMINS EMISSION SOLUTIONS INC., Columbus, IN (US)

(72) Inventors: Chetan Ponnathpur, Columbus, IN (US); Tushar Tej Dandu, Columbus, IN (US)

(73) Assignee: CUMMINS EMISSION SOLUTIONS INC., Columbus, IN (US)

(*) Notice: Subject to any disclaimer, the term of this patent is extended or adjusted under 35 U.S.C. 154(b) by 162 days.

(21) Appl. No.: 16/642,714

(22) PCT Filed: Aug. 29, 2018

(86) PCT No.: PCT/US2018/048486
§ 371 (c)(1),
(2) Date: Feb. 27, 2020

(87) PCT Pub. No.: WO2019/046391
PCT Pub. Date: Mar. 7, 2019

(65) Prior Publication Data
US 2021/0079825 A1    Mar. 18, 2021

Related U.S. Application Data

(60) Provisional application No. 62/552,873, filed on Aug. 31, 2017.

(51) Int. Cl.
*F01N 3/20* (2006.01)
*B01D 29/66* (2006.01)
*B01D 35/147* (2006.01)
(Continued)

(52) U.S. Cl.
CPC ......... *F01N 3/2066* (2013.01); *B01D 29/668* (2013.01); *B01D 35/147* (2013.01);
(Continued)

(58) Field of Classification Search
CPC ............... B01D 2201/16; B01D 29/668; B01D 35/147; B01D 53/9418; F01N 2240/36;
(Continued)

(56) References Cited

U.S. PATENT DOCUMENTS

| | | | |
|---|---|---|---|
| 4,916,897 A | 4/1990 | Hayashi et al. | |
| 6,398,119 B1 * | 6/2002 | Duffer | G05D 23/1366 236/34.5 |

(Continued)

FOREIGN PATENT DOCUMENTS

| | | | |
|---|---|---|---|
| JP | 2010-007617 | * | 1/2010 |
| JP | 2010-007617 A | | 1/2010 |
| KR | 20040039264 | * | 5/2004 |

OTHER PUBLICATIONS

International Search Report in PCT Application No. PCT/US2018/048486, dated Oct. 29, 2018, pp. 1-2.
Written Opinion in PCT Application No. PCT/US2018/048486, dated Oct. 29, 2018, pp. 1-5.

*Primary Examiner* — Sizo B Vilakazi
*Assistant Examiner* — Diem T Tran
(74) *Attorney, Agent, or Firm* — Foley & Lardner LLP

(57) ABSTRACT

An inline reductant filter assembly includes a filter housing, a filter media, and one or more valves. The filter housing is fluidly coupled to an upstream portion of a reductant line and a downstream portion of the reductant line. The filter media is positioned in the filter housing. The one or more valves are selectively movable from a first position to a second position. In the first position, the one or more valves permit fluid to flow along a first fluid flow path from the upstream portion of the reductant line, through the filter media, to the downstream portion of the reductant line. In the second position, the one or more valves prevent fluid from flowing along the first fluid flow path through the filter media.

20 Claims, 5 Drawing Sheets

(51) Int. Cl.
*B01D 53/94* (2006.01)

(52) U.S. Cl.
CPC ...... *B01D 53/9418* (2013.01); *B01D 2201/16* (2013.01); *F01N 2610/02* (2013.01); *F01N 2610/1426* (2013.01); *F01N 2610/1433* (2013.01); *F01N 2610/1493* (2013.01)

(58) Field of Classification Search
CPC ............. F01N 2240/40; F01N 2410/00; F01N 2410/04; F01N 2410/08; F01N 2610/02; F01N 2610/1426; F01N 2610/1433; F01N 2610/1453; F01N 2610/1493; F01N 3/031; F01N 3/08; F01N 3/18; F01N 3/20; F01N 3/2066; F01N 3/28; Y02T 10/12

See application file for complete search history.

(56) References Cited

U.S. PATENT DOCUMENTS

| | | | |
|---|---|---|---|
| 9,157,393 B2* | 10/2015 | Fulton | F02M 63/0225 |
| 2005/0193724 A1 | 9/2005 | Webb et al. | |
| 2009/0145402 A1* | 6/2009 | Sano | F02M 37/32 |
| | | | 123/447 |
| 2012/0234770 A1* | 9/2012 | Goodwin | B01D 35/147 |
| | | | 210/739 |
| 2013/0205756 A1 | 8/2013 | Levin et al. | |
| 2014/0352284 A1 | 12/2014 | Maguin | |
| 2015/0128906 A1* | 5/2015 | Futa | F02M 37/36 |
| | | | 123/445 |
| 2015/0240683 A1 | 8/2015 | Hudgens et al. | |
| 2017/0037763 A1 | 2/2017 | Mutti et al. | |

* cited by examiner

INLINE FILTER ASSEMBLY WITH PURGE VALVING

CROSS-REFERENCE TO RELATED APPLICATIONS

The present application is a U.S. national stage of PCT Application No. PCT/US2018/048486, filed Aug. 29, 2018, which claims priority to U.S. Provisional Appl. Application No. 62/552,873, filed Aug. 31, 2017, the contents of which are hereby incorporated by reference in their entireties.

TECHNICAL FIELD

The present application relates generally to the field of filtration systems for internal combustion engines.

BACKGROUND

For internal combustion engines, such as diesel engines, nitrogen oxide ("$NO_x$") compounds may be emitted in the exhaust. To reduce $NO_x$ emissions, a selective catalytic reduction ("SCR") process may be implemented to convert the $NO_x$ compounds into more neutral compounds (such as diatomic nitrogen, water, or carbon dioxide) with the aid of a catalyst and a reductant. The catalyst may be included in a catalyst chamber of an exhaust system, such as that of a vehicle or power generation unit. A reductant, such as anhydrous ammonia or urea, is typically introduced into the exhaust gas flow prior to the catalyst chamber. To introduce the reductant into the exhaust gas flow for the SCR process, an SCR system may dose or otherwise introduce the reductant through a doser that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to inline filtration systems with valves to permit a purge process. One implementation relates to an inline reductant filter assembly that includes a filter housing, a filter media, and one or more valves. The filter housing is fluidly coupled to an upstream portion of a reductant line and a downstream portion of the reductant line. The filter media is positioned in the filter housing. The one or more valves are selectively movable from a first position to a second position. In the first position, the one or more valves permit fluid to flow along a first fluid flow path from the upstream portion of the reductant line, through the filter media, to the downstream portion of the reductant line. In the second position, the one or more valves prevent fluid from flowing along the first fluid flow path through the filter media.

In some implementations, the one or more valves positioned in the second position permit fluid to flow along a second fluid flow path that bypasses the filter media. The one or more valves may be configured to move from the first position to the second position responsive to a purge process. The one or more valves can be passive valves or moveable responsive to a data signal from a controller. The filter housing can be upstream or downstream of a pump. The one or more valves can be check valves. The one or more valves can be moved to the first position for priming. The one or more valves can be two valves with a first valve positioned at an inlet portion of the filter housing and a second valve positioned at an outlet portion of the filter housing.

Another implementation relates to a reductant delivery system that includes a reductant pump, a reductant line in fluid communication with the reductant pump and a doser, a filter housing, a filter media, and one or more valves. The filter housing is fluidly coupled to an upstream portion of the reductant line and a downstream portion of the reductant line. The filter media is positioned in the filter housing. The one or more valves are selectively movable from a first position to a second position. In the first position, the one or more valves permit fluid to flow along a first fluid flow path from the upstream portion of the reductant line, through the filter media, to the downstream portion of the reductant line. In the second position, the one or more valves permit fluid to flow from the downstream portion of the reductant line to the upstream portion of the reductant line without flowing through the filter media.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for inline filtration systems with purge valves. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some exhaust systems, inline reductant filters can be used to filter debris or other contaminants from reductant supplied to a doser. Filtering of debris and/or other contaminants can reduce the likelihood of clogging in a fluid supply or return line and/or clogging of a doser and/or a pump. For diesel exhaust fluid ("DEF") systems that purge reductant from fluid lines during a shutdown event, the purging process purges the reductant in the filter, thereby increasing the time to prime the reductant delivery system by refilling the inline reductant filter with reductant during the next key-on or prime cycle. The increase in priming time and volume of reductant can be reduced and/or eliminated by bypassing the inline reductant filter during the purge process. This allows for a quicker prime during a subsequent prime cycle and also reduces the volume of reductant to be pumped by a pump.

II. Overview of Aftertreatment System

Figure 1:
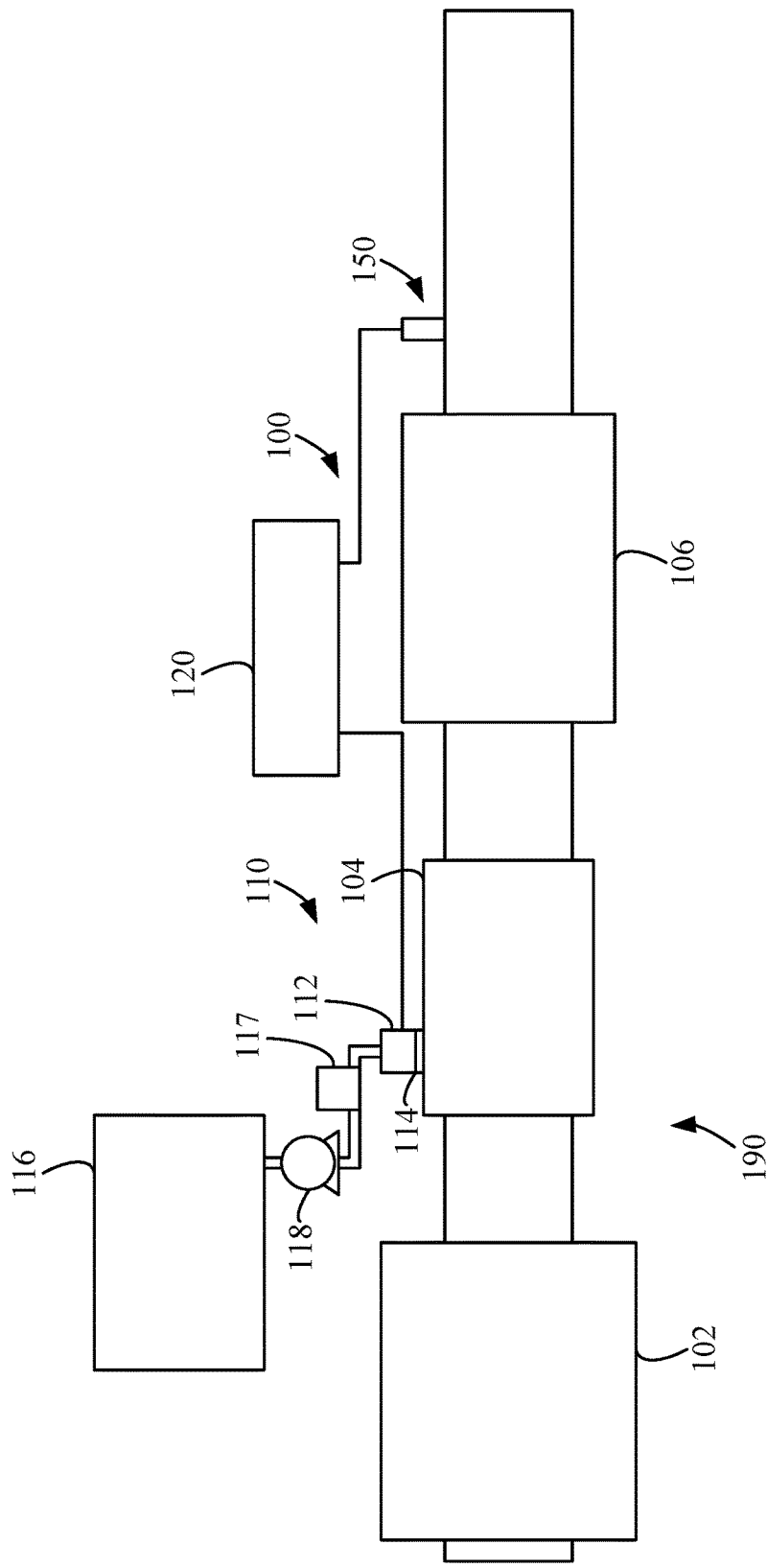
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a particulate filter, for example a diesel particulate filter ("DPF") 102, the reductant delivery system 110, a decomposition chamber or reactor pipe 104, a SCR catalyst 106 (e.g., a catalyst chamber containing a catalyst), and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant (such as urea, aqueous ammonia, or DEF) into ammonia. The decomposition chamber 104 includes a reductant delivery system 110 having a doser 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the doser 112 mounted to the decomposition chamber 104 such that the doser 112 may dose the reductant into the exhaust gases flowing in the exhaust system 190. The doser 112 may include an insulator 114 interposed between a portion of the doser 112 and the portion of the decomposition chamber 104 to which the doser 112 is mounted. The doser 112 is fluidly coupled to one or more reductant sources 116. In some implementations, a pump 118 may be used to pressurize the reductant from the reductant source 116 for delivery to the doser 112. In some implementations, a filter assembly 117 can be positioned between the reductant source 116 and the doser 112. The filter assembly 117 can be upstream or downstream of the pump 118. In other implementations, the filter assembly 117 can be integrated into the pump 118. In still other implementations, the filter assembly 117 can be integrated into the doser 112 and/or reductant source 116. The filter assembly 117 can include a filter housing, a filter media, and one or more valves, as described in greater detail below.

The doser 112 and pump 118 are also electrically or communicatively coupled to a controller 120. In some implementations, the one or more valves can be electrically or communicatively coupled to the controller 120. The controller 120 is configured to control the doser 112 to dose reductant into the decomposition chamber 104. The controller 120 may also be configured to control the pump 118 and/or the one or more valves of the filter assembly 117. The controller 120 may include a microprocessor, an application-specific integrated circuit ("ASIC"), a field-programmable gate array ("FPGA"), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory ("EEPROM"), erasable programmable read only memory ("EPROM"), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst, for example a diesel oxidation catalyst ("DOC"), in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating ("SDPF"). In some implementations, the doser 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 extending into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. Example Inline Filter Assembly with Purge Valves

In some implementations, an aftertreatment system can include a filter assembly for filtering reductant upstream of a doser. In certain aftertreatment systems, the doser and/or reductant lines to and/or from the doser may be purged, such as to reduce the likelihood of reductant expanding and freezing, thereby deforming and/or bursting the reductant lines or damaging the doser. Thus, in some implementations, the aftertreatment system can include a purging process or cycle to clear reductant from the doser and/or reductant lines. For systems with a filter assembly, this purging process may result in the filter assembly and/or filter media being purged of reductant as well. Purging the filter media of reductant can result in increased priming times for the dosing system and may also increase the workload on the pump of the reductant system, which can decrease the life of the pump. Accordingly, it may be advantageous to maintain reductant in the filter media to reduce priming time for the reductant system and decrease the workload on the pump.

Figure 2:
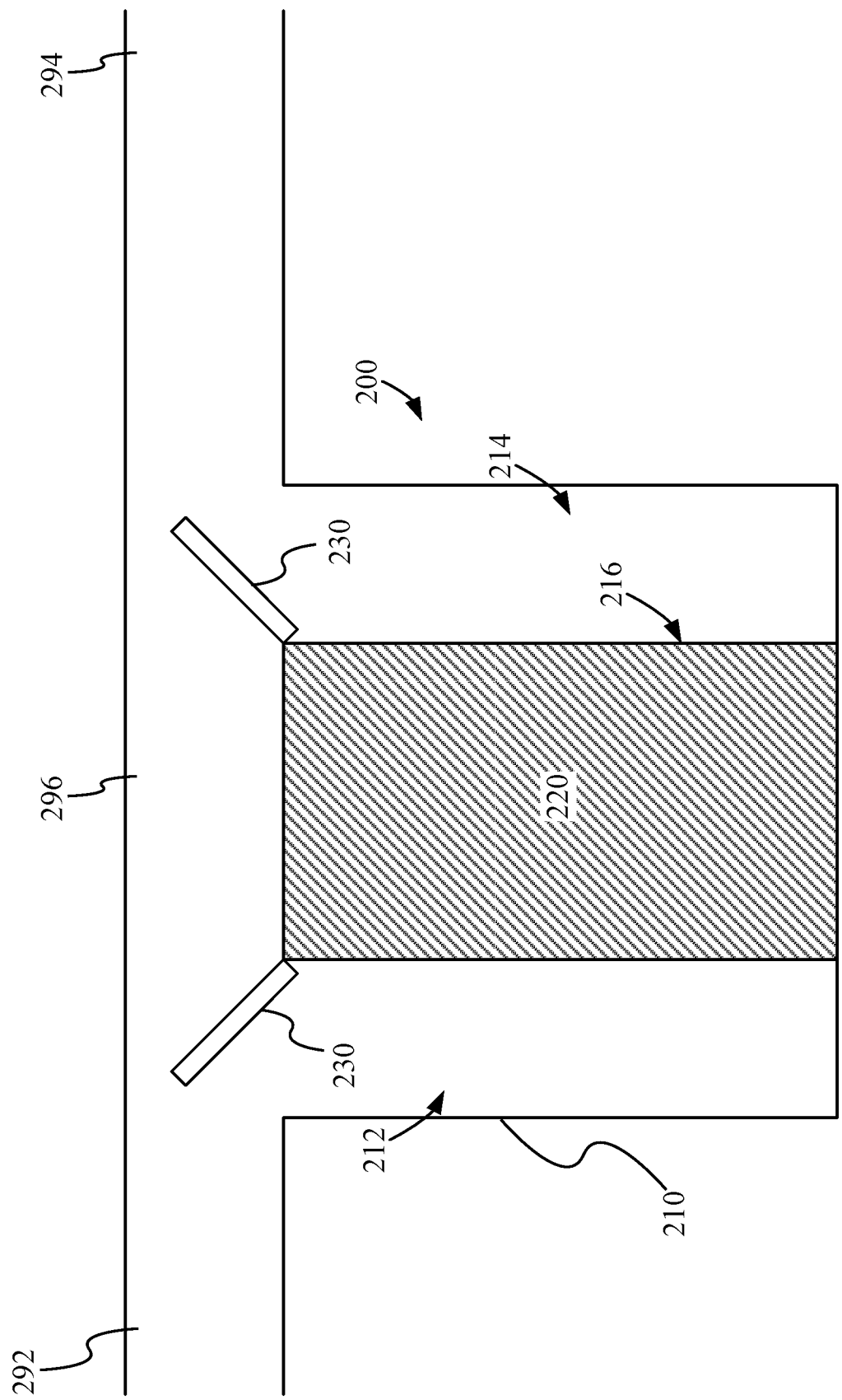
FIG. 2 is a schematic view of an inline filtration assembly with one or more valves for purging.

FIG. 2 depicts a schematic of an implementation of an inline filter assembly 200 that can be used in an aftertreatment system, such as aftertreatment system 100. The inline filter assembly 200 includes a filter housing 210, a filter media 220, and one or more valves 230. The filter housing 210 is connected and fluidly coupled to an upstream portion 292 of a reductant line and a downstream portion 294 of the reductant line. In the implementation shown, the filter housing 210 and filter media 220 are in-line with the reductant line. The filter housing 210 includes an inlet portion 212, an outlet portion 214, and a filter media portion 216. The inlet portion 212 can include a channel, pipe, or other component to provide reductant fluid from the upstream portion 292 of the reductant line to the filter media portion 216. In some implementations, the inlet portion 212 may be a canister or other casing that surrounds the filter media portion 216. The outlet portion 214 can include a channel, a pipe, or other component to provide reductant fluid from the filter media portion 216 to the downstream portion 294 of the reductant line. In some implementations, the outlet portion 214 may be an interior chamber of the filter media 220 and/or filter media portion 216. The filter media portion 216 is a cavity or other region sized to accommodate the filter media 220 and into which the filter media 220 can be inserted. In some instances, the filter media portion 216 may include attachment features (such as threading, clips, clamps, etc.) for the filter media 220 to be secured within the filter media portion 216.

Figure 3A:
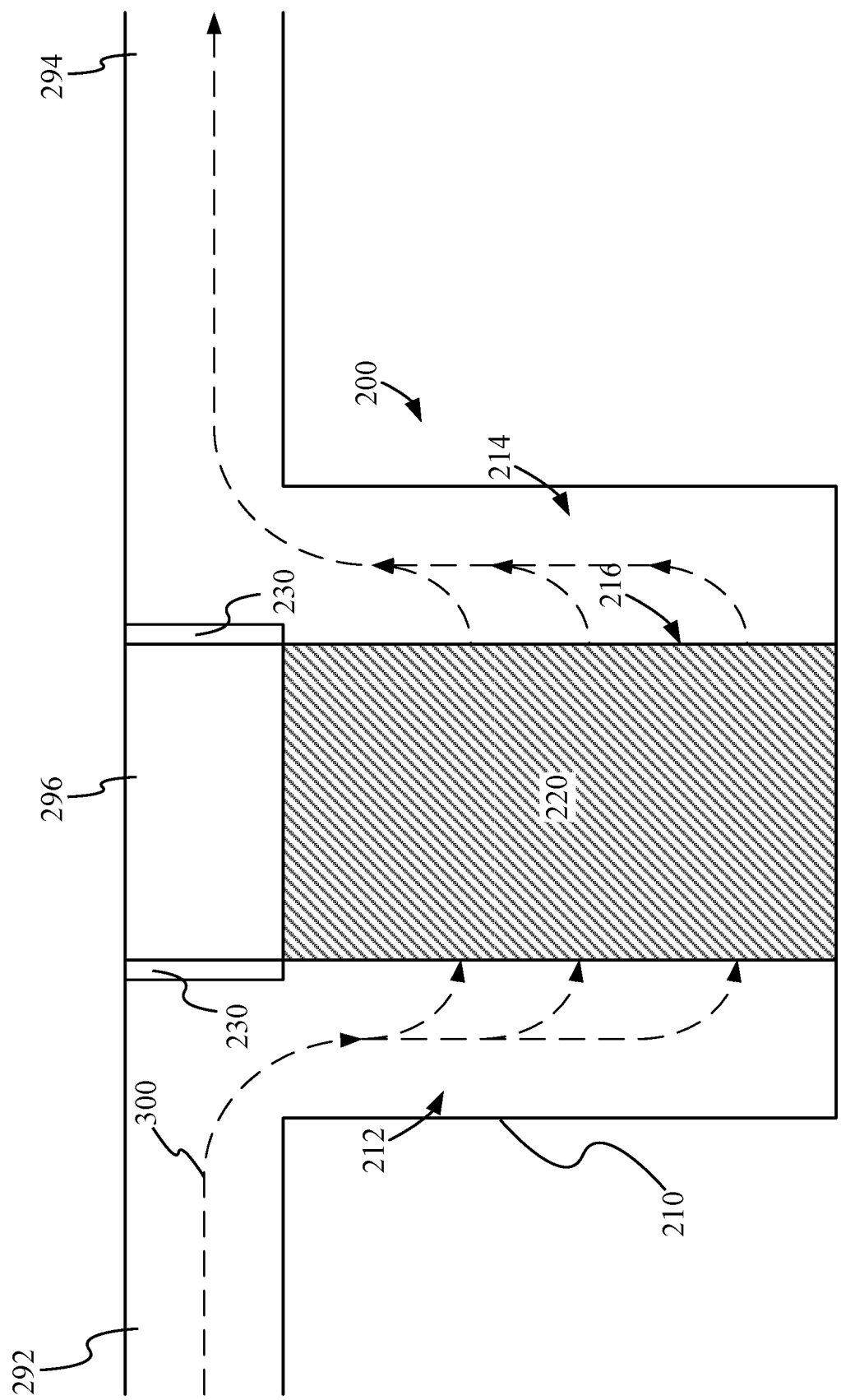
FIG. 3A is a schematic view of the inline filtration assembly of FIG. 2 showing the valves in a first position to prime the filter.

The filter assembly 200 includes one or more valves 230 positioned to selectively open and close a first fluid flow path 300 and a second fluid flow path 350. When the one or more valves 230 are open, such as is shown in FIG. 3A, the first fluid flow path 300 permits reductant to flow from the upstream portion 292 of the reductant line (from the reductant source and/or pump), through the inlet portion 212 of the filter housing 210, through the filter media portion 216 containing the filter media 220, through the outlet portion 214 of the filter housing 210, and out to the downstream portion 294 of the reductant line (and to the doser and/or pump). Thus, when the first fluid flow path 300 is open via the one or more valves 230, reductant can be pumped into the filter housing 210 and filter media 220 to prime the filter housing 210 and filter media 220 with reductant prior to dosing reductant with the doser.

Figure 3B:
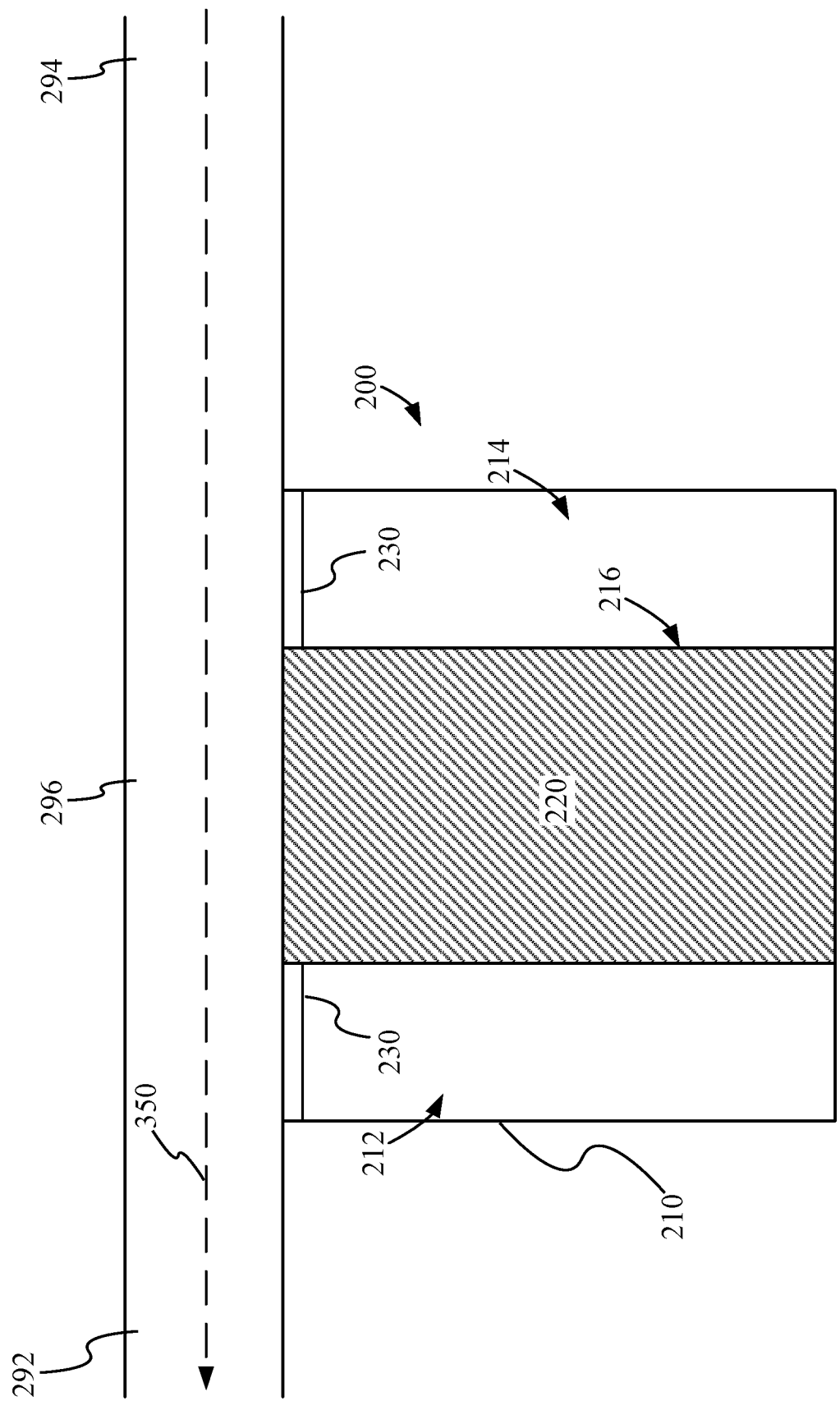
FIG. 3B is a schematic view of the inline filtration assembly of FIG. 2 showing the valves in a second position.

When the one or more valves 230 are closed, such as is shown in FIG. 3B, the one or more valves 230 prevent fluid from flowing along the first fluid flow path. Rather, the one or more valves 230 permit reductant to flow along a second fluid flow path 350 to flow from the downstream portion 294 of the reductant line (from the doser and/or pump), through a filter bypass portion 296 of the reductant line, and out to the upstream portion 292 of the reductant line (and to the pump and/or reductant source) when a purge process occurs. In some implementations, the purge process can occur responsive to a diagnostic condition determined by a controller, responsive to a key-off event, or responsive to a predetermined temperature threshold (e.g., below a freezing temperature for reductant). When the purge process occurs, the one or more valves 230 are closed to prevent fluid flow into the fluid housing 210 and/or the filter media 220. Thus, when the first fluid flow path 300 is re-opened via the one or more valves 230, reductant can be pumped into the filter housing 210 and filter media 220 without priming or minimal priming of the filter housing 210 and filter media 220 with reductant prior to dosing reductant with the doser.

The one or more valves 230 can be check valves or any one-way type valve. For instance, the one or more valves 230 may be flapper or swing check valves, stop check valves, or other valves to selectively close and open the first and second fluid flow paths 300, 350. In some implementations, the one or more valves 230 can be passive valves (e.g., spring loaded or resiliently deformable) that selectively open the first fluid flow path 300 of FIG. 3A when positive pressure of reductant is provided from the upstream portion 292 of the reductant line and selectively close the first fluid flow path 300 of FIG. 3A when no pressure or positive pressure of reductant is provided from the downstream portion 294 of the reductant line.

In other implementations, the one or more valves 230 may be electronically controlled, such as by the controller 120 of FIG. 1. The controller can output a first data signal to a motor (e.g., a servo), an actuator, or other component to move a corresponding valve 230 of the one or more valves 230 from a first position to a second position to open the first fluid flow path 300. When a purge process is initiated, the controller can output a second data signal, responsive to data indicative of the initiation of the purge process, to the motor (e.g., a servo), actuator, or other component to move a corresponding valve 230 of the one or more valves 230 from the second position to the first position to close the first fluid flow path 300 and open the second fluid flow path 350.

The purge process can include supplying air from an air supply to a doser and/or the reductant line upstream of the inline filter assembly 200. In other implementations, the purge process can include a pump pumping the reductant from the reductant line and/or doser into the reductant source.

Figure 4:
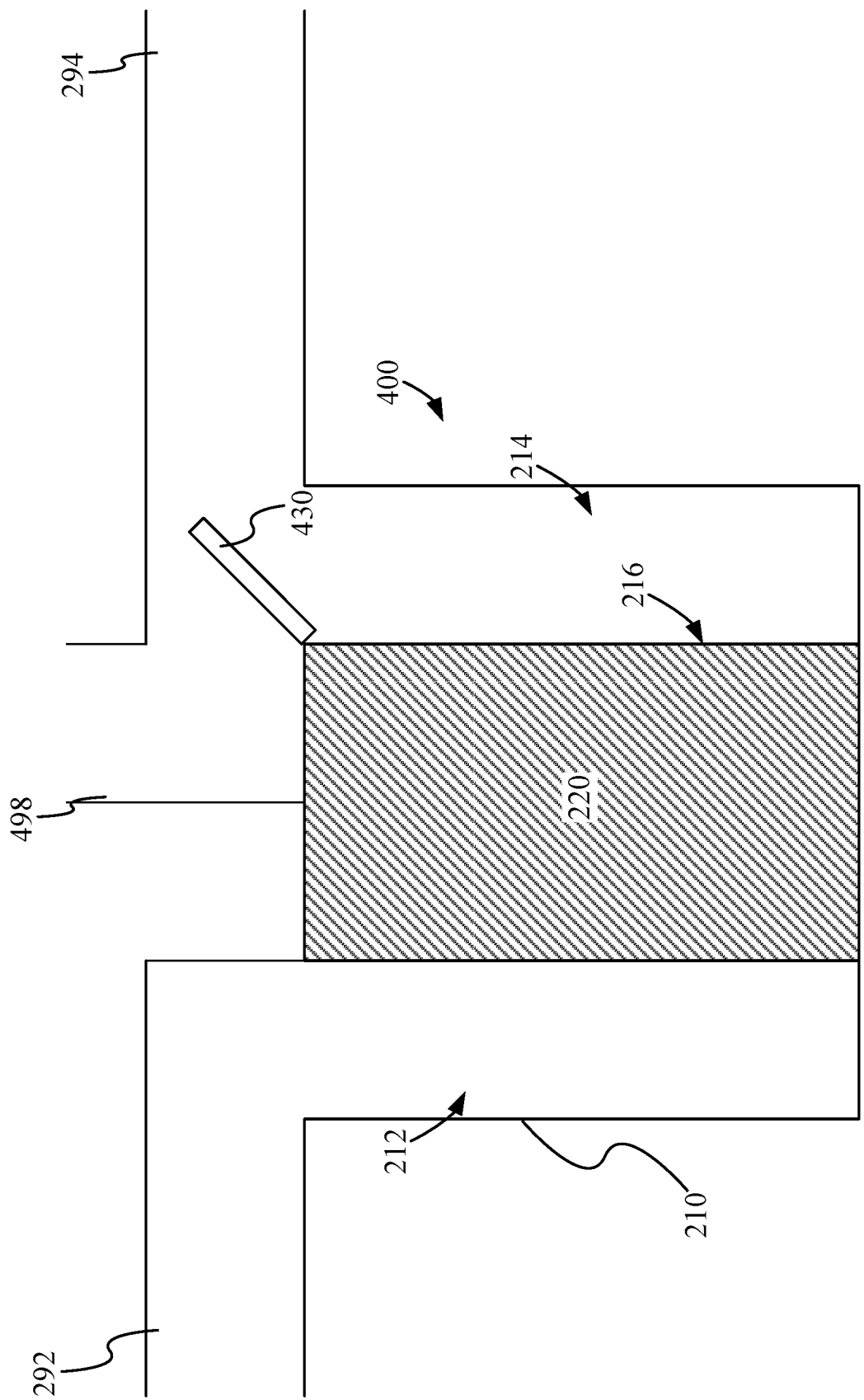
FIG. 4 is a schematic view of an inline filtration assembly with a valve for purging to a purge line.

FIG. 4 depicts a schematic of another implementation of an inline filter assembly 400 that can be used in an aftertreatment system, such as aftertreatment system 100. The inline filter assembly 400 includes the filter housing 210, filter media 220, and a valve 430. The filter housing 210, filter media 220, and upstream and downstream portions 292, 294 of the reductant line may be constructed in accordance with those described in reference to FIG. 2. In the implementation shown, the valve 430 is positioned to selectively open and close a purge line 498 to allow fluid to flow from the downstream portion 294 of the reductant line to the purge line 498. Thus, in the implementation shown, when the valve 430 is selectively opened, reductant flows along a first fluid flow path from the upstream portion 292 of the reductant line (from the reductant source and/or pump), through the inlet portion 212 of the filter housing 210, through the filter media portion 216 containing the filter media 220, through the outlet portion 214 of the filter housing 210, and out to the downstream portion 294 of the reductant line (and to the pump and/or doser). When the valve 430 is selectively closed, the valve 430 prevents fluid from flowing along the first fluid flow path; instead, the valve 430 permits reductant to flow along a second fluid flow path from the downstream portion 294 of the reductant line (from the doser and/or pump) out to the purge line 498 (and to the pump and/or reductant source) when a purge process occurs.

The valve 430 can be a check valve or any one-way type valve. For instance, the valve 430 may be a flapper or swing check valve, stop check valve, or other valve to selectively close and open the first fluid flow path and the second fluid flow path. In some implementations, the valve 430 can be a passive valve that selectively opens the first fluid flow path when positive pressure of reductant is provided from the upstream portion 292 of the reductant line to the outlet portion 214 of the filter housing 210 and selectively close the first fluid flow path when no pressure or positive pressure of reductant is provided from the downstream portion 294 of the reductant line.

In other implementations, the valve 430 may be electronically controlled, such as by the controller 120 of FIG. 1. The controller can output a first data signal to a motor (e.g., a servo), an actuator, or other component to move the valve 430 from a first position to a second position to open the first fluid flow path. When a purge process is initiated, the controller can output a second data signal, responsive to data indicative of the initiation of the purge process, to the motor (e.g., a servo), actuator, or other component to move the valve 430 from the second position to the first position to close the first fluid flow path and open the second fluid flow path through the purge line 498.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry (e.g., an FPGA or an ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An assembly comprising:
   a reductant line comprising an upstream portion, a bypass portion continuous with the upstream portion, and a downstream portion continuous with the bypass portion;
   a filter housing configured to be fluidly coupled to the upstream portion of the reductant line and the downstream portion of the reductant line;
   a filter media positioned in the filter housing; and
   a first valve selectively movable from a first position to a second position;
   wherein:
      an inlet channel is located in the filter housing upstream of the filter media, and an outlet channel is located in the filter housing downstream of the filter media;
      when the first valve is in the first position, the first valve is located between the bypass portion of the reductant line and the downstream portion of the reductant line, and reductant is flowable along a first fluid flow path from the upstream portion of the reductant line, through the filter media, to the downstream portion of the reductant line; and
      when the first valve is in the second position, the first valve is located between the outlet channel of the filter and the downstream portion of the reductant line to prevent fluid from flowing along the first fluid flow path through the filter media, and reductant is flowable along a second fluid flow path from the downstream portion of the reductant line to the bypass portion of the reductant line and from the bypass portion of the reductant line to the upstream portion of the reductant line.

2. The assembly of claim 1, wherein the inline reductant filter assembly is configured such that the first valve moves from the first position to the second position in response to a purge process.

3. The assembly of claim 1, wherein the first valve is a passive valve.

4. The assembly of claim 3, wherein the first valve is structured to selectively move from the second position to the first position in response to positive pressure of reductant being provided to the first valve from the upstream portion of the reductant line.

5. The assembly of claim 1, wherein the inline reductant filter assembly is configured such that the first valve moves in response to a data signal from a controller.

6. The assembly of claim 1, wherein the filter housing is upstream of a pump.

7. The assembly of claim 1, wherein the filter housing is downstream of a pump.

8. The assembly of claim 1, wherein the first valve is a check valve.

9. The assembly of claim 1, wherein the inline reductant filter assembly is configured such that the first valve moves to the first position for priming.

10. The assembly of claim 1, further comprising:
    a second valve, wherein:
       when the second valve is in the first position, the second valve is located between the upstream portion of the reductant line and the bypass portion of the reductant line, and reductant is flowable along a first fluid flow path from the upstream portion of the reductant line, through the filter media, to the downstream portion of the reductant line; and
       when the second valve is in the second position, the second valve is located between the inlet channel of the filter and the upstream portion of the reductant line to prevent fluid from flowing along the first fluid flow path through the filter media.

11. The assembly of claim 10, wherein the second valve is structured to selectively move from the first position to the second position in response to positive pressure of reductant being provided to the second valve from the downstream portion of the reductant line.

12. A reductant delivery system comprising:
    the assembly of claim 1;
    a reductant pump in fluid communication with the reductant line; and
    a doser in fluid communication with the reductant line.

13. An assembly comprising:
    a reductant line comprising an upstream portion and a downstream portion;
    a purge line connected with the downstream portion of the reductant line;
    a filter housing configured to be fluidly coupled to the upstream portion of the reductant line and the downstream portion of the reductant line;
    a filter media positioned in the filter housing; and
    a first valve selectively movable from a first position to a second position;
    wherein:
       an inlet channel is located in the filter housing upstream of the filter media, and an outlet channel is located in the filter housing downstream of the filter media;
       when the first valve is in the first position, the first valve is located between the purge line and the downstream portion of the reductant line, and reductant is flowable along a first fluid flow path from the upstream portion of the reductant line, through the filter media, to the downstream portion of the reductant line; and
       when the first valve is in the second position, the first valve is located between the outlet channel of the filter and the downstream portion of the reductant line to prevent fluid from flowing along the first fluid flow path through the filter media, and reductant is flowable along a second fluid flow path from the downstream portion of the reductant line out to the purge line.

14. A reductant delivery system comprising:
    the assembly of claim 13; and
    a doser in fluid communication with the downstream portion of the reductant line,
    wherein the assembly is configured such that the first valve moves from the first position to the second position in response to a purge process of the doser for clearing reductant from the doser and/or the reductant line out to the purge line.

15. The assembly of claim 13, wherein the first valve is a passive valve.

16. The assembly of claim 15, wherein the first valve is structured to selectively move from the second position to the first position in response to positive pressure of reductant being provided to the first valve from the upstream portion of the reductant line.

17. The assembly of claim 13, wherein the assembly is configured such that the first valve moves in response to a data signal from a controller.

18. The assembly of claim 13, wherein the filter housing is upstream of a pump.

19. The assembly of claim 13, wherein the filter housing is downstream of a pump.

20. The assembly of claim 13, wherein the first valve is a check valve.

* * * * *